US012752811B2

(12) United States Patent
Johnson

(10) Patent No.: US 12,752,811 B2
(45) Date of Patent: Oct. 6, 2026

(54) VEHICLE FORWARD BLIND SPOT OBJECT DETECTION SYSTEM

(71) Applicant: FCA US LLC, Auburn Hills, MI (US)

(72) Inventor: Andrew D Johnson, Auburn Hills, MI (US)

(73) Assignee: FCA US LLC

( * ) Notice: Subject to any disclaimer, the term of this patent is extended or adjusted under 35 U.S.C. 154(b) by 0 days.

(21) Appl. No.: 18/910,533

(22) Filed: Oct. 9, 2024

(65) Prior Publication Data

US 2026/0097779 A1 Apr. 9, 2026

(51) Int. Cl.
*B60W 50/14* (2020.01)
*G06N 20/00* (2019.01)

(52) U.S. Cl.
CPC ............. *B60W 50/14* (2013.01); *G06N 20/00* (2019.01); *B60W 2520/105* (2013.01); *B60W 2554/402* (2020.02); *B60W 2554/4041* (2020.02); *B60W 2554/4044* (2020.02); *B60W 2554/80* (2020.02)

(58) Field of Classification Search
CPC ............................................... B60W 2050/143
USPC ....................................................... 340/425.5
See application file for complete search history.

(56) References Cited

U.S. PATENT DOCUMENTS 5,646,612 A * 7/1997 Byon ........................ B60T 7/22 340/901
6,014,601 A * 1/2000 Gustafson .............. G08G 1/166 340/436
6,989,754 B2 * 1/2006 Kisacanin .............. G06V 20/58 340/576
10,354,155 B2 7/2019 Fürsich
11,346,951 B2 5/2022 Lu et al.
11,410,556 B2 8/2022 Huang
11,787,287 B2 10/2023 Sakai
2003/0220728 A1 * 11/2003 Rao ........................ B60R 21/013 340/436
2015/0336524 A1 * 11/2015 Lamer ..................... B60R 11/04 293/120
2017/0106857 A1 * 4/2017 Nasser .................. B60W 30/09
2019/0047559 A1 * 2/2019 Conde ................... B60W 50/14
2019/0205609 A1 * 7/2019 Taveira ..................... G08G 5/80
2023/0064517 A1 * 3/2023 Weston .................. G08G 1/005
2023/0296768 A1 9/2023 Courtois et al.

* cited by examiner

*Primary Examiner* — Travis R Hunnings
(74) *Attorney, Agent, or Firm* — Jeremy J. Klobucar

(57) ABSTRACT

A method of detecting and providing notification of objects in or near a vehicle blind spot includes determining that an object is present in a predetermined area outside a vehicle, determining that the object is animate or that the object is inanimate, setting a closeness threshold based on whether the object is determined to be animate or inanimate, wherein the closeness threshold is different when the object is determined to be animate than when the object is determined to be inanimate, determining a projected path of travel for the vehicle, and comparing the projected path of travel with the closeness threshold. When the projected path of travel has at least a portion that is within a distance equal to or less than the closeness threshold from the object, a notification of alert is provided within the vehicle to make the driver aware of the presence of the object.

12 Claims, 4 Drawing Sheets

VEHICLE FORWARD BLIND SPOT OBJECT DETECTION SYSTEM

FIELD

The present disclosure relates to a vehicle having a system for detecting objects near and forward of the vehicle.

BACKGROUND

Vehicles often have pillars containing structural members to support a vehicle body and other various components. These pillars often obstruct a substantial portion of a driver's field of view. This can create problems for the driver as areas outboard of the pillars and below one or more windows of the vehicle (e.g. below a windshield and below windows in vehicle doors) may be obscured from view. Additionally, vehicles typically have side mirrors mounted to and extending outwardly from the sides of the vehicle, and oriented facing rearwardly. Such rearview side mirrors provide a field of view that can reduce blind spots behind the driver and to the sides of the vehicle, but the side mirrors themselves create blind spots near the vehicle and partially block the driver's field of view.

SUMMARY

In at least some implementations, a method of detecting and providing notification of objects in or near a vehicle blind spot includes determining that an object is present in a predetermined area outside a vehicle, determining that the object is animate or that the object is inanimate, setting a closeness threshold based on whether the object is determined to be animate or inanimate, wherein the closeness threshold is different when the object is determined to be animate than when the object is determined to be inanimate, determining a projected path of travel for the vehicle, and comparing the projected path of travel with the closeness threshold. When the projected path of travel has at least a portion that is within a distance equal to or less than the closeness threshold from the object, a notification of alert is provided within the vehicle to make the driver aware of the presence of the object.

In at least some implementations, the closeness threshold is greater when the object is determined to be inanimate than when the object is determined to be animate. In at least some implementations, the method includes using machine learning programming to improve the determination of whether the object is animate or inanimate.

In at least some implementations, the method includes determining that the object is moving, determining a path of movement of the object, and comparing, relative to the closeness threshold, the projected path of travel with one or both of the location of the object and with the path of movement of the object.

In at least some implementations, the predetermined area includes one or more blind spots relative to a driver of the vehicle. In at least some implementations, at least one of the one or more blind spots includes an area in front of the vehicle and below a hood of the vehicle, or behind, relative to a driver of the vehicle, a pillar or side mirror of the vehicle.

In at least some implementations, the object is a living thing and a path of movement of the living thing is determined and the notification is provided as a function of the determined path of movement.

In at least some implementations, the method includes terminating the alert when the location of the object or the path of movement of the object are no longer within at least one threshold of the vehicle or the path of travel for the vehicle.

In at least some implementations, the method includes determining a vehicle dynamic including a vehicle speed or a vehicle acceleration, and wherein the notification is provided as a function of the vehicle dynamic. In at least some implementations, the step of detecting that an object is present in a predetermined area outside a vehicle occurs when the vehicle is traveling below a speed threshold. In at least some implementations, the speed threshold is ten miles per hour or less.

In at least some implementations, the notification is provided by illuminating a light in the vehicle that is within a line of sight between a driver of the vehicle and the object, or within forty-five degrees from the line of sight.

In at least some implementations, a method of detecting objects in or near a vehicle blind spot includes making a first determination that an object is present in a predetermined area outside a vehicle, making a first determination that the object is animate or that the object is inanimate, making a first determination of a path of movement of the object for an object determined to be moving, making a first determination of a projected path of travel for the vehicle, comparing the projected path of travel with one or both of the location of the object and with the path of movement of the object, providing a notification within the vehicle when the location of the object or the path of movement of the object are within at least one threshold distance of the vehicle or the path of travel for the vehicle. The method further includes making a second determination that an object is present in a predetermined area outside a vehicle, making a second determination that the object is animate or that the object is inanimate, making a second determination of the path of movement of the object for an object determined to be moving, making a second determination of the projected path of travel for the vehicle, and comparing the second projected path of travel with one or both of the location of the object and with the path of movement of the object to determine if the notification should be terminated or maintained, and comparing at least one first determination with a corresponding second determination and determining a difference between the at least one first determination and the corresponding second determination, and updating at least one program parameter as a function of the difference.

In at least some implementations, the at least one program parameter relates to determination if the object is animate or inanimate.

In at least some implementations, the at least one program parameter relates to one or more of a shape, size or detection of a limb of an animate object.

In at least some implementations, the at least one program parameter relates to determination of the travel path of the vehicle, and wherein the at least one program parameter is updated when the difference between the at least one first determination and the corresponding second determination is outside of a threshold.

In at least some implementations, the at least one program parameter relates to determination of the path of movement of the object, and wherein the at least one program parameter is updated when the difference between the at least one first determination and the corresponding second determination is outside of a threshold.

In at least some implementations, the method includes making a first determination of a type of animate object when the object is determined to be an animate object, or making a first determination of a type of inanimate object when the object is determined to be an inanimate object. In at least some implementations, the method also includes comparing the first determination of the type of animate object or the type of inanimate object to the corresponding second determination and wherein the at least one program parameter is updated when the first determination is different from the corresponding second determination.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
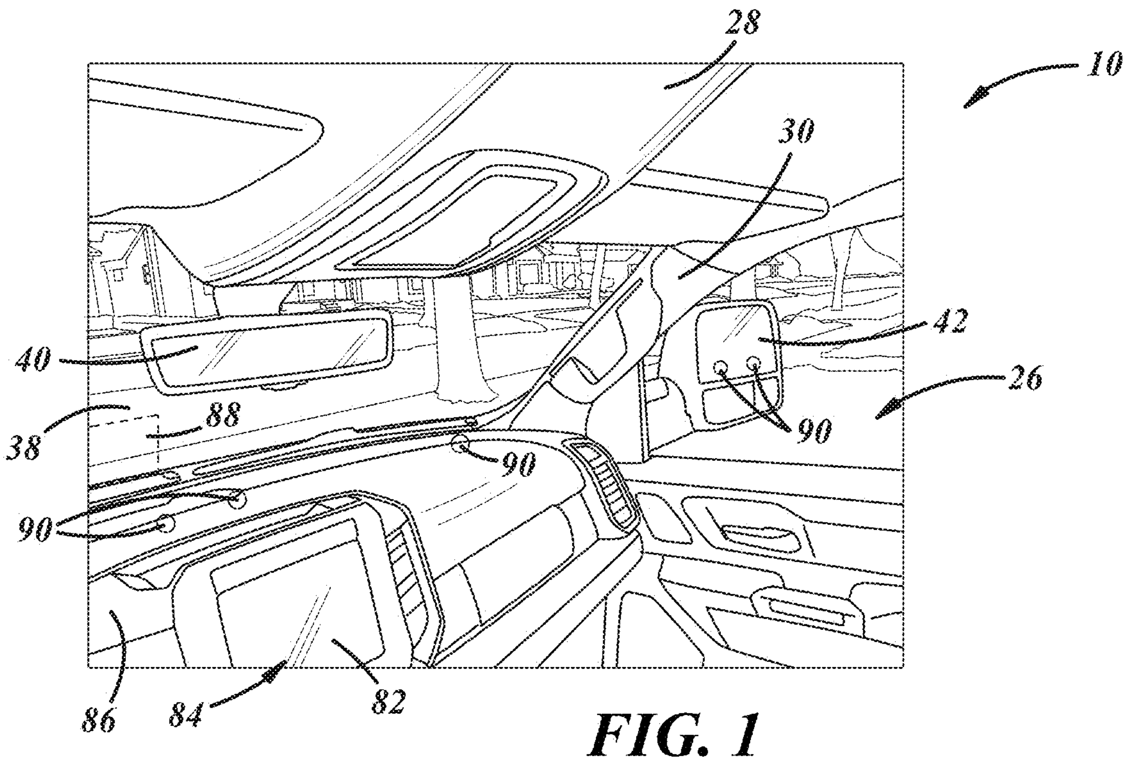
FIG. 1 is a perspective view of part of a vehicle interior as viewed by a driver of the vehicle.
Figure 2:
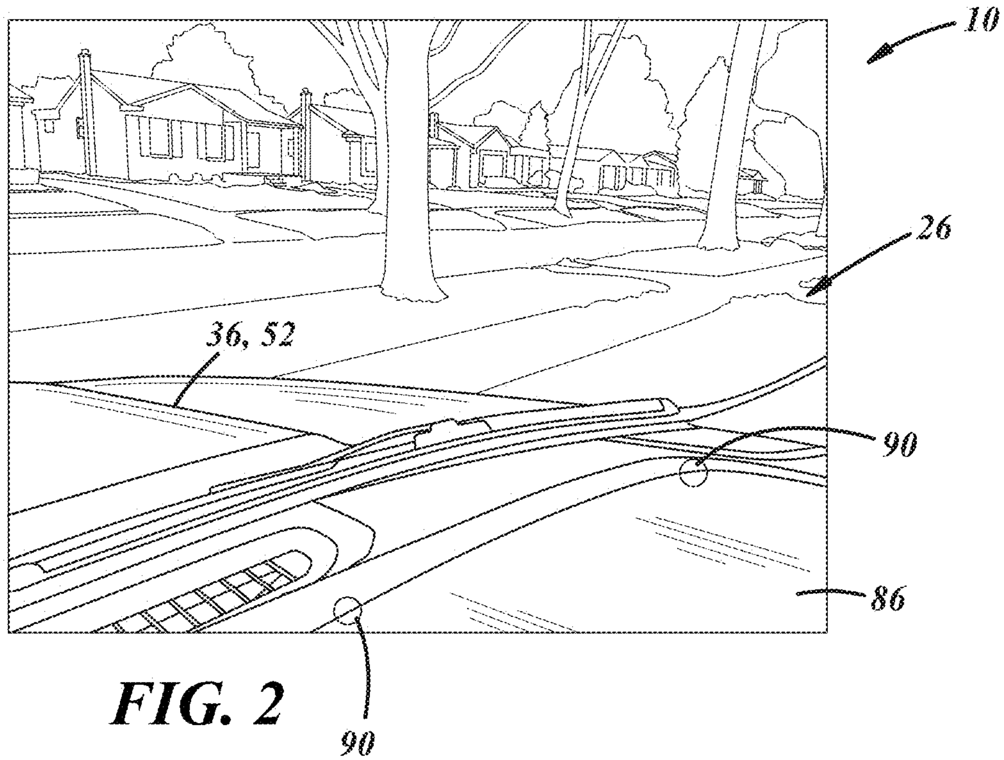
FIG. 2 is a perspective view similar to FIG. 1 as viewed by a camera in the interior.
Figure 3:
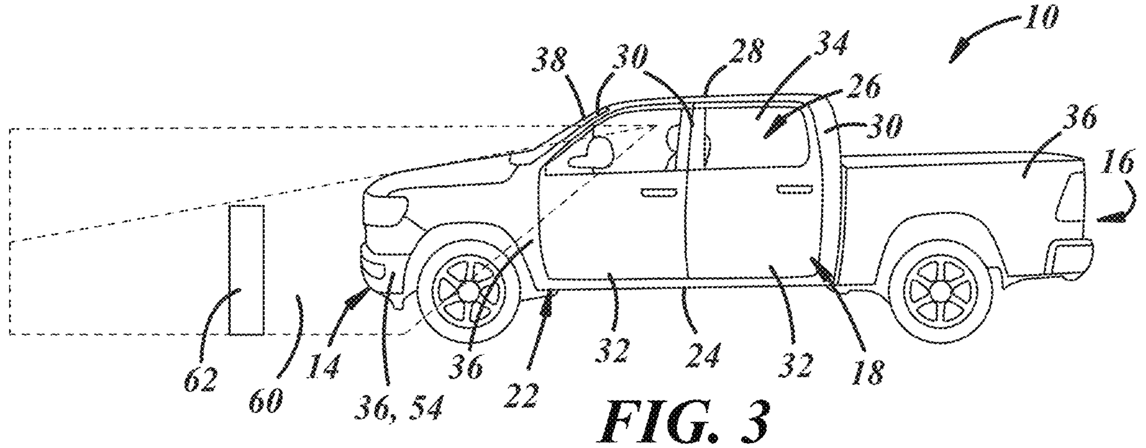
FIG. 3 is a side view of the vehicle showing a driver's field of view.
Figure 4:
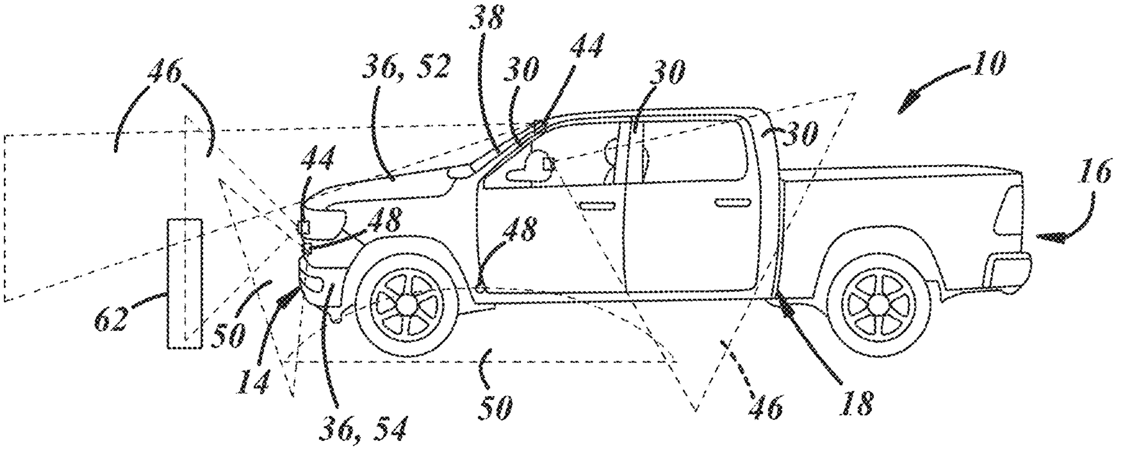
FIG. 4 is a side view of the vehicle showing the field of view of some object detection devices of the vehicle.
Figure 5:
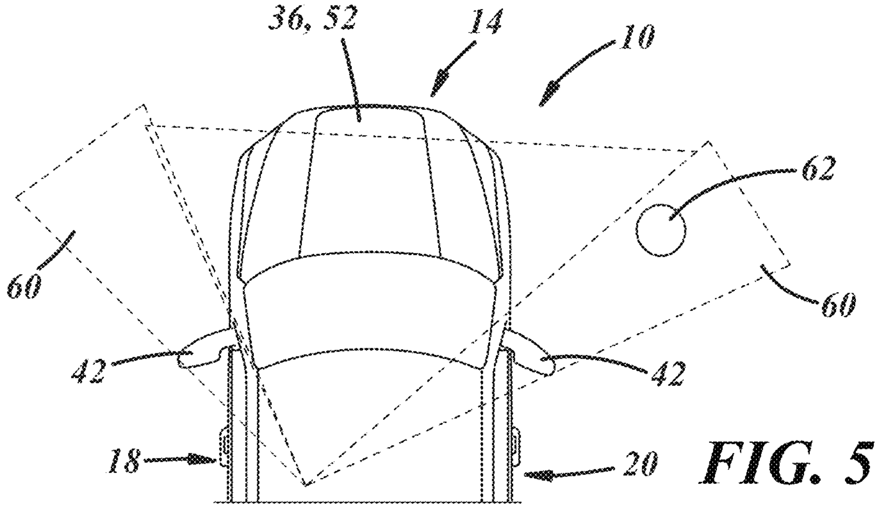
FIG. 5 is a top view of part of the vehicle showing a driver's field of view.
Figure 6:
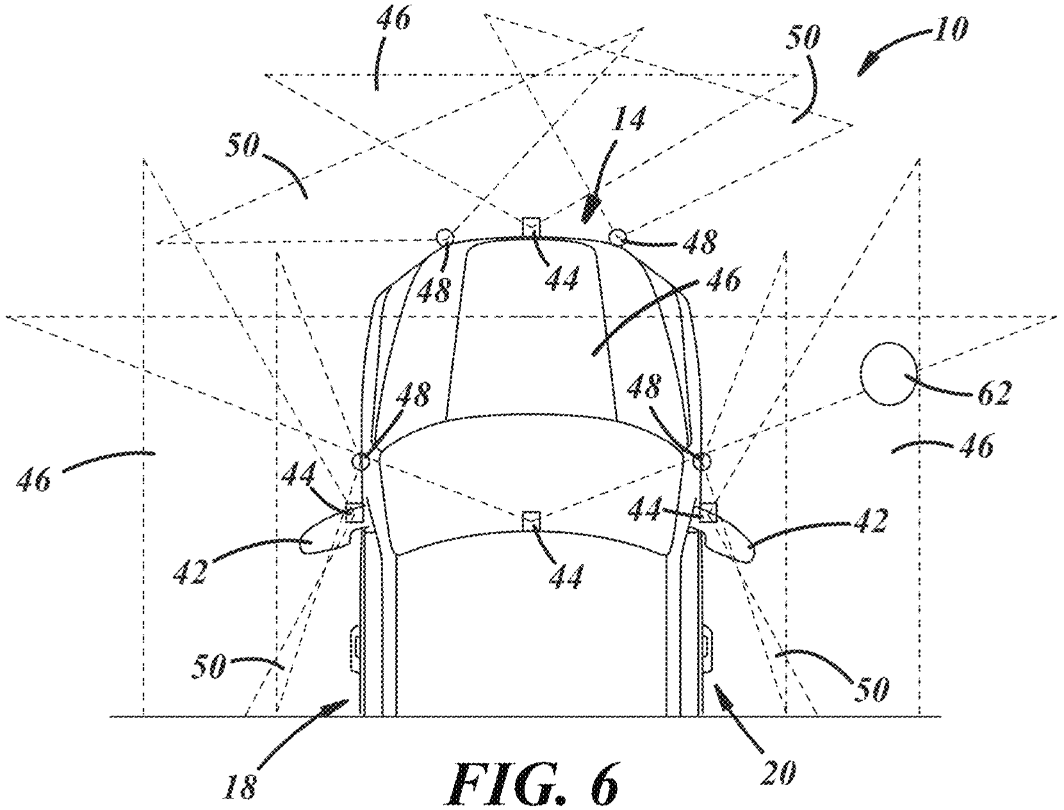
FIG. 6 is a top view of the vehicle showing the field of view of some object detection devices of the vehicle.

Referring in more detail to the drawings, FIGS. 1-6 show a vehicle 10 having a driver blind spot object detection system 12. As shown in FIGS. 3-6, the vehicle 10 has a front end 14, a rear end 16 (FIGS. 3 and 4), a left side 18 and an opposite right side 20 (FIGS. 5 and 6). Referring to FIG. 3, a vehicle body 22 includes a substructure (i.e. frame, unibody), a floor 24 defining a bottom of an interior 26 of the vehicle 10, a roof 28, an inner surface of which defines a top of the interior 26, and pillars 30 and other support members extending between the floor and the roof. The substructure supports doors 32, windows 34, body panels 36, and mechanical and electrical systems of the vehicle 10.

The pillars 30 may extend from the floor of the vehicle 10, or other portion of the substructure, and may support part of the roof 28, doors 32, windows 34, windshield 38, among other vehicle components. Pillars 30 may be spaced apart and located at multiple positions along the vehicle 10. As shown in FIGS. 1 and 2, forwardmost pillars 30, relative to the front of the vehicle, are generally known as A-pillars, while pillars further back towards the rear are known as B-pillars and C-pillars, and D-pillars are provided in some vehicles.

The vehicle 10 may also include multiple mirrors arranged to increase the driver's field of view and include areas behind the driver. For example, a rear-view mirror 40 (FIG. 1) may be mounted to or near the windshield 38 and provide a view out of a rear window of the vehicle, and side mirrors 42 may be mounted to the left and right sides 18, 20 of the vehicle 10 near the A-pillars 30 and are oriented to provide the driver with a view toward the rear an along the sides 18, 20 of the vehicle.

As shown in FIGS. 4 and 6, the blind spot object detection system 12 includes one or more cameras 44, each camera 44 having an input (i.e. aperture) through which light enters, which may include a lens, an image sensor and an output via which image data is provided from the camera 44. Light within a field of view 46 (FIGS. 4 and 6) of the camera 44 enters the camera 44 through the input and lens. The size and scope of the field of view 46 may vary based on lens dimensions and/or the size of an input opening of the camera 44. In some implementations a lens having a wide field of view, such as between thirty (30) degrees and three hundred and sixty (360) degrees, and in some implementations from forty-five (45) to two hundred (200) degrees, may be preferred to include a larger portion of the area outward from the camera 44. In other embodiments a narrower field of view may be preferred to include a more specific area outward from the camera 44. As used herein, the term "captured field of view" refers to the field of view 46 of the camera 44.

As shown in FIGS. 1 and 2, one or more cameras 44 may be mounted on the vehicle 10 in any desired location(s). In at least some implementations, one or more cameras 44 is/are located so that the captured field of view 46 includes an area outward of a side 18 or 20 of the vehicle 10. In at least some implementations, the captured field of view 46 includes an area outward of the A-pillar 30, outward of and in front of one or both of the side mirrors 42, or all of these areas that are blocked from direct viewing by a driver of the vehicle because of the location of the driver relative to the A-pillars 30 and side mirrors 42. In some implementations, the captured field of view 46 of at least one camera 44 may include an area outward of one of the A-pillars 30 and include at least a portion of the area outward of the vehicle 10 between the rear end 16 and the A-pillars 30, which may be similar to the field of view provided by a traditional rear view side mirror 42 if provided on the vehicle 10. The camera(s) 44 captured field of view 46 can include an area outward of any portion of the vehicle 10, as desired, and more cameras 44 may be utilized, as desired.

As shown in FIGS. 3-6, in addition to the cameras 44, the vehicle 10 may one or more other object detection sensors 48. The object detection sensors 48 may emit light or sound waves and use reflected waves to detect objects, determine distance of the object from the sensor 48, and the like. The object detection sensors 48 may be of different types, like LiDAR, RADAR, sonar, ultrasonic, and the like. The sensors 48 are operable to detect the presence of objects within the working area or field of view 50 of the sensor 48. The working area or field of view 50 of the sensors 48 is the area in which a sensor is capable of sensing things, similar to a camera field of view (which is the area from which light can be captured or "seen" by a camera 44). Objects near the vehicle can be detected by a camera 44 or an object detection sensor 48, and in this way, the cameras 44 can be used as and can be considered to be object detection sensors 48.

As shown in the embodiment of FIG. 4, one or more front sensors 44, 48 can be mounted to the exterior of the vehicle at or near the front of the vehicle, with each having at least one field of view 46, 50 that extends forward and in front of the vehicle 10. The front sensors 44, 48 can have a wide field of view 46, 50 including areas in front of and to the sides 18, 20 of the vehicle 10, generally to the side and at or in front of the windshield 38. In the example shown, a first front camera 44 is mounted below a vehicle hood 52 and on a front fascia 54 (FIGS. 3 and 4) of the vehicle, and a second front facing camera 44 is mounted near the roof, and behind the windshield 38, generally between the windshield 38 and the rear-view mirror 40. Similarly, other front object detection sensors 48, can be mounted to the front fascia of the vehicle 10 and arranged to detect objects in front of the vehicle 10.

In this way, one or more object detection sensors 44, 48 are provided below the height or level of the hood 52, and part of the captured field of view 46 of this or these sensors 48 includes, as shown by comparison of FIGS. 3 and 4, a driver blind spot area in front of the vehicle and below the hood 52. Further, the higher mounted camera 44 or other sensor 48 can provide a field of view 46, 50 that includes areas forward of the windshield 38 and to the sides 18, 20 of the vehicle, with limitations or blind spots caused by vehicle front body panels 36, 52. Additionally, FIG. 1 shows a driver's field of view out of the windshield 38 and toward the right side A-pillar 30, and FIG. 2 shows a captured field of view 46 from a front camera 44 near the rear-view mirror, where the area behind the A-pillar 30 and side mirror 42 can be seen by one or more cameras 44 to facilitate detecting objects in the areas not directly visible to a driver.

As shown in FIGS. 4 and 6, one or more object detection sensors 44, 48 may be mounted to the exterior of the vehicle 10 and positioned to have a captured or working field of view 46, 50 that includes areas to the sides 18, 20 of the vehicle. Here, first and second side cameras 44 and/or other sensors 48 are mounted to the exterior of the left and right A-pillars 30 or to the side mirrors 42. Each side sensor 44, 48 may have a captured field of view 46, 50 extending outward to the side of the respective A-pillar 30, both forward and rearward of the A-pillar 30 and downward toward the ground (as well as upward, if desired). The captured fields of view 46, 50 include vehicle blind spots caused by one or more and up to all of the A-pillars 30, the side mirrors 42, and the vehicle body including the doors 32 and front body panels 36. The captured fields of view 46, 50 of the front camera(s) 44 or sensor(s) 48 and side camera(s) 44 or sensor(s) 48 at a vehicle side 18, 20 may overlap, as shown in FIG. 6.

The video or image output from each of the one or more camera(s) 44, as well as the data from one or more other object detection sensors 48, is provided to a control system 56 (shown in FIG. 7) that is in communication with the sensors 44, 48 by wired or wireless connection. The control system 56 is or has a processor arranged to control the output received from the cameras 44 and can process the video to, if desired, alter the size, scale, quality, zoom, contrast, color, brightness, and other image/video properties, and in at least some implementations can divide the captured field of view 46 (e.g. provided cropped portions) to enable separate display of portions of the captured field of view 46. In at least some implementations, the image(s) are processed to improve image quality or improve contrast to enable more accurate edge detection (e.g. Canny edge detection) to identify object boundaries. From this, relevant features may be extracted from the detected edges, such as shape, size and texture. Feature descriptors (e.g., HOG-Histogram of Oriented Gradients features) may be used to represent the detected objects in a feature space, if desired. The detected objects may then be compared to templates or other information to enable identification (e.g. detection and classification) of the objects (e.g. vehicle, pedestrian, animal, etc). Similarly, the control system 56 may process non-camera sensor data to filter or otherwise improve the data for further analysis and processing, or raw data may be used in later analysis and processing, as desired.

As shown FIG. 3, the driver has a blind spot 60 that is in front of the vehicle, and as shown in FIG. 5, driver blind spots 60 can exist forward of the driver and to the sides 18, 20 of the vehicle. These blind spots 60 are caused by one or more of the A-pillar 30, side mirror 42 and the hood 52, doors or other vehicle body panels. Objects 62 in a driver blind spot 60 are not seen by the driver, and pose challenges to vehicle navigation. As shown in FIGS. 4 and 6, the cameras 44 can be arranged so that the captured field of view 46 of one or more cameras 44 includes most or all of the areas in the driver blind spots 60.

One or more of the object detection sensors 48 may also be used to detect movement of an object 62 relative to the vehicle, such as by comparison of images from a camera 44 or data from a non-camera object detection sensor 48. To do this, object recognition techniques can be used and then the position of an object 62 within a captured or working field of view 46, 50 at one time can be compared with the position of the object 62 in the captured field of view 46, 50 at a later time to determine if the object 62 has moved during that time.

Figure 7:
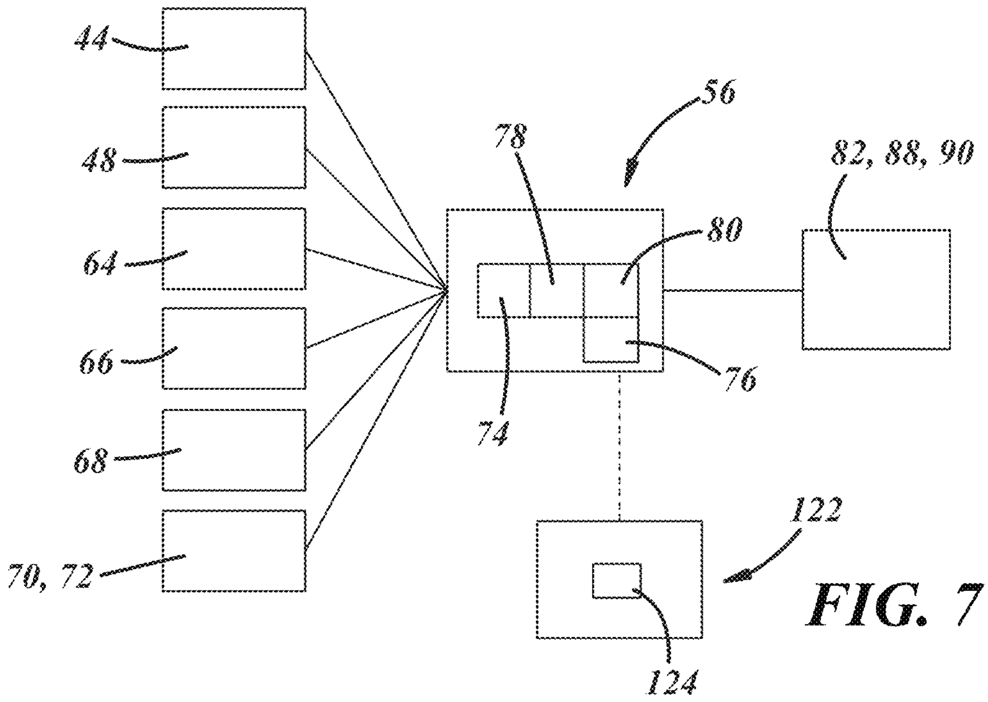
FIG. 7 is a diagrammatic view of a vehicle control system.

In addition to the object detection sensors 48, other sensors can be used to provide information to the control system 56. As shown in FIG. 7, by way of non-limiting examples, a vehicle speed sensor 64, an accelerometer 66 and a steering angle sensor 68 provide information about vehicle dynamics. Other data sources may be available to the control system 56 and provide information about the area near the vehicle 10, such as a GPS unit 70 and map data 72 which may be stored in memory 74 of the control system 56 or provided from a remote source, and which may include information about the location of intersections, road path/turns/bends, if any, and the like. Any data sources that are remotely located (e.g. not in the vehicle) may be communicated with the vehicle 10 in any suitable manner, such as via a cellular or other wireless network and via a communications device 76 (e.g. telematics unit) of the vehicle 10.

To perform the functions and desired processing set forth herein, as well as the computations therefore, the control system 56 may include, but is not limited to, one or more controller(s), control unit(s), processor(s), computer(s), DSP (s), memory, storage, register(s), timing, interrupt(s) (generally referred to by reference numeral 78), communication interface(s), and input/output signal interfaces, and the like, as well as combinations comprising at least one of the foregoing. For example, the control system 56 may include input signal processing and filtering to enable accurate sampling and conversion or acquisitions of such signals from communications interfaces and sensors. As used herein the terms control system 56 may refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. The control system 56 may be distributed among different vehicle modules, such as an infotainment system control module, engine control module or unit, powertrain control module, transmission control module, and the like, if desired.

The term "memory" 74 or "storage" as used herein can include computer readable memory, and may be volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory 74 can store an operating system and/or instructions/programs 80 executable by a processor or controller or the like to enable control or allocate resources of a computing device.

The control system 56 may include programming 80 suitable to determine the location of objects 62 relative to the vehicle, whether the objects 62 are moving or not, the direction of travel and speed of moving objects 62, a projected path of moving objects 62, and whether the objects 62 are living things or inanimate. Further, the control system 56 may include programming suitable to determine a type or group for at least certain objects 62. Representative types or groups include persons, animals, vehicles (including bicycles, wheelchairs, cars, SUVs, trucks, busses, etc), plants/trees/other flora, and structures and other objects 62 typically near roads (e.g. buildings/walls, curbs, street lights, telephone poles, street signs, mailboxes, fire hydrants, etc). Classification of objects 62 may be done by object-recognition techniques applied to the image or sensor data, and by comparison to predefined parameters for the groups and types of objects 62.

Additionally, machine learning techniques may be used to improve the classification of objects 62 over time, and in use of the vehicle 10. The machine learning techniques can be used to improve the recognition of objects 62 and reduce incorrect classifications over time. For example, if the control system 56 initially determines a classification of an object 62, or that an object 62 is moving, and analysis of further or later data determines the original determination to be incorrect, then the system can update definitions and thresholds used to reduce future instances in which the same or a similar object 62 is incorrectly classified or determined to be moving. Persons or animals may be determined not only from movement, but from the presence of limbs and the movement of limbs, based on peripheral size/shape (e.g. edge detection of objects 62 in images), among other things. Additionally, the temperature of objects 62 may be used to determine if the object 62 is a person or animal, such as may be done with infrared cameras or sensors, if desired.

As shown in FIGS. 1 and 7, a display 82 may be part of a vehicle Human-Machine Interface 84, such as an infotainment system and may be located on or near a vehicle dashboard/instrument panel 86. Such displays may be called "heads-down" displays because they require a driver to lower their viewing angle from looking outward through a windshield 38 downward and within the vehicle 10 to see the display 82. The display 82 may also or instead be provided as a so-called heads-up display (HUD) 88 that is provided (e.g. projected) on the windshield 38 of the vehicle 10. With a heads-up display 88, the information displayed can be viewed by a driver along with the environment outside the vehicle 10 and in view through the windshield 38.

In at least some implementations, notifications or alerts can be provided to a driver via one or more displays 82, 88. The information on the displays 82, 88 may include graphics and text to indicate the presence of objects 62 and living things and provide guidance to a driver regarding recommendations for proceeding (e.g. "stop" or "slow down", etc). Additionally, a live feed from one or more cameras 44 or other object detection sensors 48 may be provided on part of the display to show the driver an area around at least part, and up to all of the vehicle, including blind spots 60 immediately adjacent to the vehicle and not directly visible by the driver. Along with the graphics and text, a driver can quickly understand the environment outside the vehicle from the information displayed.

Additional signals or information can be provided to a driver via one or more lights 90 that may be illuminated by the control system 56 when an object 62 is detected in a blind spot 60. Representative lights 90 are shown in FIG. 1 as being on an upper surface of the dashboard 86, on the A-pillars 30 and/or on the side mirrors 42 or housings of the side mirrors 42. In at least some implementations, lights 90 are provided in multiple locations and less than all of the lights 90 are illuminated when an object 62 is detected in a blind spot 60. The light or lights 90 illuminated may be in the driver's line of sight and between the driver and the detected object 62. That is, if the detected object 62 is in front of the center of the vehicle 10, one or more lights 90 on/near the center of the dashboard 86 may be illuminated to inform the driver of the presence of an object 62 in that direction. Similarly, if the object 62 is in front of but to one side of the vehicle, a light in that general direction relative to the driver can be illuminated, and likewise for objects 62 behind the A-pillar 30 and/or side mirrors 42, where lights 90 in the driver's line of sight toward those areas can be illuminated. Here, the indication of "line of sight" is intended to include a direct line of sight as well as within a typical range of peripheral vision, such as within forty-five degrees of the direct line of sight.

The control system 56 has inputs from the object detection sensors 44, 48 which provide information regarding the presence of an intersection or adjacent road surface, parking lot or other area of interest, the vehicle speed, vehicle accelerations (e.g. slowing down or speeding up, or lateral/turning acceleration), direction of travel including steering angle/intended future direction of travel, the presence of objects 62 in a defined area around the vehicle 10 (e.g. within a threshold distance and/or in a blind spot or potentially in a blind spot after further vehicle movement), the travel path of moving things (e.g. people walking), and the like. For example, the control system 56 can determine not only the presence of people near the vehicle, but their direction and speed of movement, to help determine if the paths of movement of the people and the path of travel of the vehicle 10 might intersect, or come within a distance threshold, in which case the vehicle 10 should be slowed or stopped.

For example, many people may cross an intersection or the path of a vehicle in a parking lot and it can be difficult for a driver to determine if all of those people have fully moved out of the way of the vehicle 10. For example, a small child or dog may have strayed from the group of people and stayed in the path of the vehicle 10 but out of the driver's sight, in a blind spot 60. The driver may additionally have to consider people walking near or across other portions of the area, and the path of travel for all people, with respect to the intended path of travel of the vehicle 10.

Figure 8:
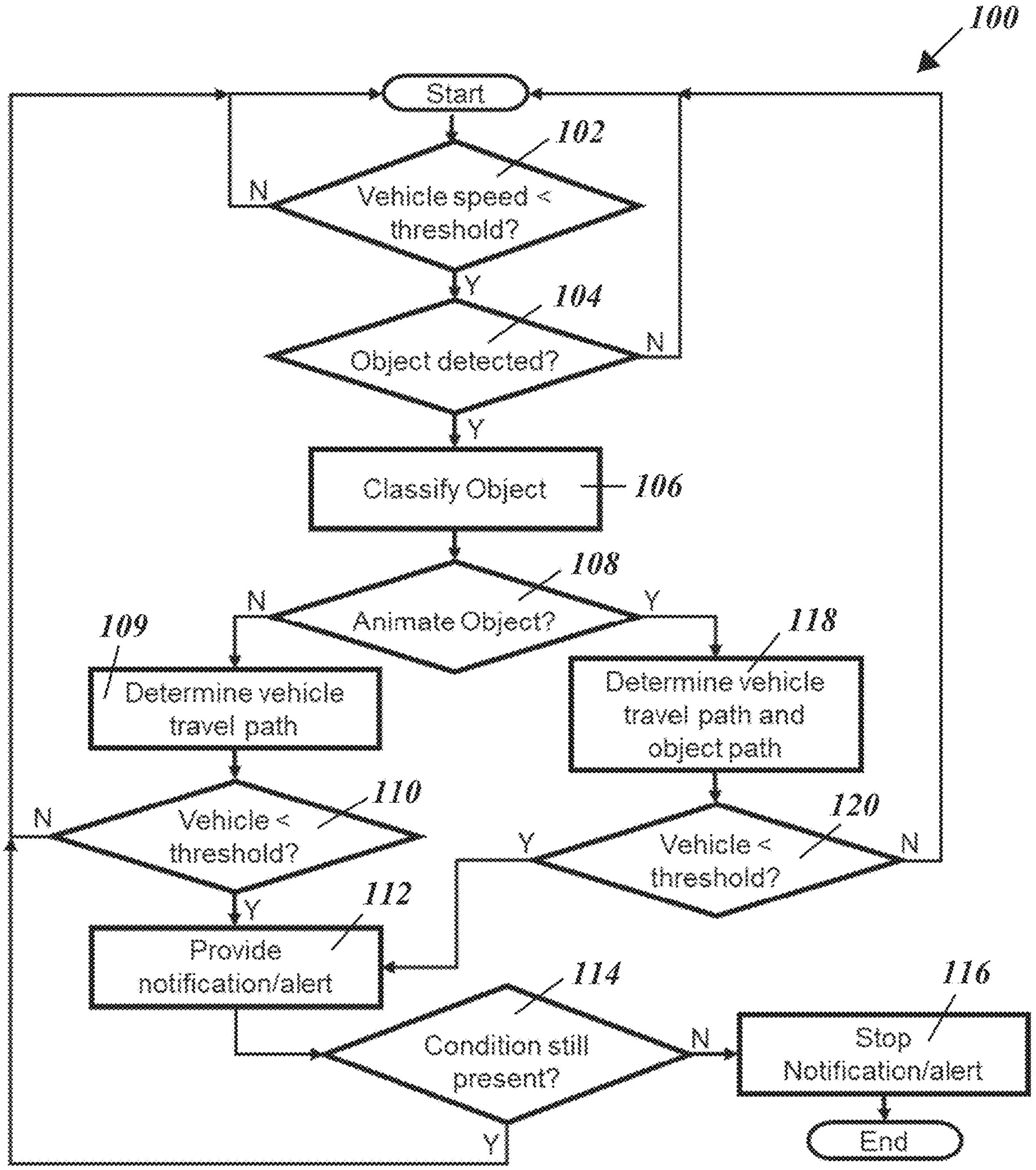
FIG. 8 is a flowchart for a method of detecting objects in a vehicle blind spot and alerting a driver.

FIG. 8 shows a flowchart for a method 100 of detecting objects 62 near a vehicle, particularly in vehicle blind spots 60, and for alerting the driver. In step 102 it is determined if the vehicle is traveling below a threshold speed. In at least some implementations, the method is performed only when the vehicle is traveling below a threshold speed, for example, below fifteen miles per hour, or below ten miles per hour. At faster speeds, other vehicle safety systems like emergency braking and the like may be used for objects in the vehicle's path of travel. A slower traveling vehicle is more likely to be near an intersection or traffic light/stop or yield signal, about to make a turn or turning, or in an area, like a parking lot, where people and animals may be present. If the vehicle is traveling below the speed threshold, then the method continues to step 104, if not, the method may loop back and wait for the vehicle to slow down below the speed threshold.

In step 104, image and/or sensor data is analyzed to determine if an object 62 is detected within or near a driver blind spot 60. Here a distance threshold can be used to ensure that only data for relevant area(s) are analyzed. In one example, the distance threshold is within or less than seventy-five feed, and in some implementations, may be less than forty feet from the vehicle. Objects 62 farther away or outside of the distance threshold are less likely to interfere with or intersect the vehicle along the vehicle's travel path, and, in some implementations, may be ignored at least until the object 62 is within the distance threshold of the vehicle. Additionally, one or more object size thresholds may be used to, for example, ignore objects smaller than the first size threshold or larger than a second size threshold (e.g. and therefore able to be seen by the driver), to limit the number and type of objects 62 that are further considered in the method.

After an object 62 is detected, in step 104, that satisfies the distance threshold and any size threshold(s), the control system 56 applies image or data recognition and, in step 106, classifies the detected object 62 into one or more groups or categories. For example, the categories may be based on size or shape or movement of the detected object 62. If the detected object 62 is determined in step 108 to be an inanimate object, then in step 109 a current and/or projected path of the vehicle is determined. The current or projected path may be determined based upon, for example, the steering angle and speed of the vehicle, as well as the location and shape of a road or other surface along which the vehicle is traveling, which may be determined from data obtained from one or more object detection sensors 48, or GPS/map data 70, 72. If the road ahead curves in one direction, the vehicle travel path can be projected/determined to follow the curve even if the current steering angle does not match the future maneuver.

Next, in step 110, it is determined if, based on the determined vehicle path of travel, the vehicle will contact or pass within a closeness threshold of the object 62 if the vehicle continues on the determined vehicle path. The closeness threshold may be set as desired to provide a factor of safety and alert the driver who can then proceed more cautiously to ensure the vehicle does not hit or come too close to the detected object 62. In at least some implementations, if the vehicle is not going to pass within the closeness threshold of the object 62, then no alert or notification is provided to the driver and the method may return to step 102.

If it is determined that the vehicle is going to pass within the closeness threshold of the object 62, then the method proceeds to step 112 in which an alert or notification is provided to the driver. As noted, this alert can be provided in numerous ways, including by way of non-limiting example, information provided on a vehicle display 82, 88, sound or other audio warning, or by illuminating a light 90 in the direction or general line of sight to the detected object 62. After an alert is provided, the method may continue to step 114 to determine if the condition causing the alert is still present, or if the alert can be stopped. This may be done by re-determining the vehicle path of travel and re-comparing the path of travel of the vehicle to the location of the detected object 62. When the object 62 is no longer within the closeness threshold of the vehicle path of travel, then the method proceeds to step 116 and the alert is turned off or otherwise terminated, and the method may loop back to the start (e.g. step 102).

If in step 108 the object 62 is determined to be moving or a living/animate object 62, then the method may proceed to step 118. Thus, in at least some implementations, the method may consider a moving but inanimate object 62, such as a rolling shopping cart, blown or otherwise moving debris and the like in step 118. In step 118, the current or projected path of the vehicle is determined, and this may be done in the same manner as in step 108. Also, in step 118, the path of the moving object 62 is determined and in step 120, the moving object path is compared to the determined vehicle travel path. If it is determined that the the moving object path is within a path threshold distance, or closeness threshold of the vehicle travel path, then the method may proceed to step 112 and an alert/notification provided to the driver.

If desired, to provide a greater factor of safety to living/animate objects 62, the closeness threshold distance may be set differently if the detected object 62 is determined to be an animate/living object 62 as compared to a moving, inanimate object 62. In at least some implementations, the path threshold distance may be greater for living/animate objects 62 than for inanimate objects 62 to provide a greater "buffer zone" around animate objects 62 who may move suddenly, at different speeds and in different directions. For non-moving, inanimate objects 62, the closeness threshold may be less than the path threshold distance. In at least some implementations, the closeness threshold may be five to ten feet for inanimate objects, and ten to fifteen feet for animate objects 62. The closeness threshold may also vary based on, for example, vehicle speed, ambient light levels (with greater distances used for the threshold when lower ambient light levels are present), and other conditions, as desired.

After an alert is provided, the method 100 may continue to step 114 to determine if the condition causing the alert still exists or if the alert can be stopped. This may be done by restarting all of part of the method 100, such as by re-determining the vehicle path of travel and comparing it to the closeness threshold. When the vehicle travel path is no longer within or going to pass within the closeness threshold of the detected object path or the detected object 62, then the method 100 proceeds to step 116 and the alert is turned off or otherwise terminated, and the method 100 may loop back to the start (e.g. step 102) or end.

In this way, the object detections, object classifications or object type determinations, and the vehicle travel path determinations can be made more than once and can be updated as the vehicles moves. Subsequent images or sensor data may clarify the type of object 62 (e.g. the object may be closer and the data relating to the object clearer or better defined) and incorrect determinations can be flagged for training or updating of the machine learning programming or algorithm, to reduce future incorrect object classifications. That is, when an incorrect object classification (including whether an object 62 is animate or inanimate, as well as determining a type/kind of animate or inanimate objects 62) or trajectory/path of travel or path of movement is determined to have occurred, the information that was used to make the incorrect determination can be used to improve future, similar determinations, such as by automatically updated program parameters used to make the underlying determinations.

For example, at least one program parameter in the program used to detect and classify objects, and to predict vehicle path, object movement, and the like, can be updated as a function of the difference. Representative program parameters include at least one program parameter relating to determinations if the object is animate or inanimate, which may relate to one or more of a shape, size or detection of a limb or other distinctive feature of an animate object. Improvements in the detection of animate versus inanimate objects can ensure a desired closeness threshold can be established and reduce the number of unnecessary alerts that a driver receives, for example. Additionally, data from one object detection sensor can be compared to data from one or more other sensors to improve the determinations made from the data of each object detection sensor. For example, if analysis of camera data does not indicate motion, but the data from other sensors does indicate motion, the data sets can be used to improve future determinations. Further, the system may default to determining that motion exists as greater thresholds may be provided for moving objects.

Thus, the method may include making one or more first determinations, and then making corresponding second determinations at a later time, and comparing the first determinations and corresponding second determinations to see if there are differences that are beyond a threshold for the determination of interest. If so, data that led to the incorrect and/or the correct or updated determination can be used to update and improve the programming parameters used in making the determinations for a subsequent iteration of the method. This may be done automatically, with dynamic machine learning programs or algorithms, which may be performed or run at the vehicle level, or in a backend of a cloud-based system 122 (FIG. 7). In such a cloud-based system 122, multiple vehicles provide data to a remote server 124 (e.g. by cellular or other wireless transmission from a vehicle communications unit 76), and the remote server 124 can utilize the data from the multiple vehicles to improve the programs/algorithms, and can then, in turn, provide the updated programs/algorithms to the multiple vehicles. A cloud-based system 122 enables use of a greater range and amount of data for better and faster improvements in the programs.

The systems and methods described herein assist a driver in negotiating dynamic situations with other vehicles, pedestrians, animals and other objects 62 nearby being considered with regard to their impact on the vehicle's safe passage through an aera of interest, like an intersection or parking lot. The system is arranged to assist a driver in these dynamic situations, in particular with regard to blind spots 60 and things not directly in view of the driver. Image and sensor data can be used to intelligently set thresholds that may differ for animate and inanimate objects, and to determine if an alert should be provided to a driver to improve the driver's awareness of the surroundings and objects 62 therein. Multiple objects 62 may be detected and the systems and methods run in parallel or simultaneously for multiple objects 62 to improve vehicle navigation in the presence of such objects.

What is claimed is:

1. A method of detecting objects in or near a vehicle blind spot, comprising:

making a first determination with at least one object detection sensor of the vehicle that an object is present in a predetermined area outside a vehicle and within a blind spot that is in an area in front of the vehicle and below a hood of the vehicle, or behind, relative to a driver of the vehicle, a pillar or side mirror of the vehicle;

making a first determination that the object is animate or that the object is inanimate;

making a first determination of a path of movement of the object for an object determined to be moving;

making a first determination of a projected path of travel for the vehicle;

comparing the projected path of travel with one or both of the location of the object and with the path of movement of the object;

providing a notification within the vehicle when the location of the object or the path of movement of the object are within at least one threshold distance of the vehicle or the path of travel for the vehicle;

making a second determination with the at least one object detection sensor of the vehicle that an object is present in a predetermined area outside a vehicle, making a second determination that the object is animate or that the object is inanimate, making a second determination of the path of movement of the object for an object determined to be moving, making a second determination of the projected path of travel for the vehicle, and comparing the second projected path of travel with one or both of the location of the object and with the path of movement of the object to determine if the notification should be terminated or maintained; and comparing at least one first determination with a corresponding second determination and determining a difference between the at least one first determination and the corresponding second determination, and updating at least one program parameter as a function of the difference, wherein the program parameter relates to the determinations that the object is animate or inanimate and the updated program parameter is used in subsequent determinations that an object is animate or inanimate.

2. The method of claim 1 wherein the at least one program parameter relates to one or more of a shape, size or detection of a limb of an animate object.

3. The method of claim 1 wherein the at least one program parameter relates to determination of the travel path of the vehicle, and wherein the at least one program parameter is updated when the difference between the at least one first determination and the corresponding second determination is outside of a threshold.

4. The method of claim 1 wherein the at least one program parameter relates to determination of the path of movement of the object, and wherein the at least one program parameter is updated when the difference between the at least one first determination and the corresponding second determination is outside of a threshold.

5. The method of claim 1 which also includes making a first determination of a type of animate object when the object is determined to be an animate object, or making a first determination of a type of inanimate object when the object is determined to be an inanimate object.

6. The method of claim 5 which also includes comparing the first determination of the type of animate object or the type of inanimate object to the corresponding second determination and wherein the at least one program parameter is updated when the first determination is different from the corresponding second determination.

7. The method of claim 1 wherein the at least one threshold distance is a closeness threshold, and the closeness threshold is greater when the object is determined to be inanimate than when the object is determined to be animate.

8. The method of claim 1 which also includes determining a vehicle dynamic including a vehicle speed or a vehicle acceleration, and wherein the notification is provided as a function of the vehicle dynamic.

9. The method of claim 8 wherein the step of detecting that an object is present in a predetermined area outside a vehicle occurs only when the vehicle is traveling below a speed threshold.

10. The method of claim 9 wherein the speed threshold is ten miles per hour or less.

11. A method of detecting objects in or near a vehicle blind spot, comprising:

making a first determination with at least one object detection sensor of the vehicle that an object is present within a blind spot that is in an area in front of the vehicle and below a hood of the vehicle, or behind, relative to a driver of the vehicle, a pillar or side mirror of the vehicle;

making a first determination that the object is animate or that the object is inanimate;

making a first determination of a path of movement of the object for an object determined to be moving;

making a first determination of a projected path of travel for the vehicle;

comparing the projected path of travel with one or both of the location of the object and with the path of movement of the object;

providing a notification within the vehicle when the location of the object or the path of movement of the object are within at least one threshold distance of the vehicle or the path of travel for the vehicle and the vehicle is traveling below a speed threshold;

making a second determination with the at least one object detection sensor of the vehicle that an object is present in a predetermined area outside a vehicle, making a second determination that the object is animate or that the object is inanimate, making a second determination of the path of movement of the object for an object determined to be moving, making a second determination of the projected path of travel for the vehicle, and comparing the second projected path of travel with one or both of the location of the object and with the path of movement of the object to determine if the notification should be terminated or maintained; and comparing at least one first determination with a corresponding second determination and determining a difference between the at least one first determination and the corresponding second determination, and updating at least one program parameter as a function of the difference, wherein the updated program parameter is used in a subsequent first determination to improve the accuracy of the subsequent first determination.

12. The method of claim 11 wherein the speed threshold is ten miles per hour.

* * * * *